United States Patent
Imai

(10) Patent No.: US 10,142,511 B2
(45) Date of Patent: Nov. 27, 2018

(54) BILLING SYSTEM, IMAGE FORMING SYSTEM, CONTROL METHOD OF BILLING SYSTEM, AND CONTROL PROGRAM OF BILLING SYSTEM

(71) Applicant: Konica Minolta, Inc., Tokyo (JP)

(72) Inventor: Takuya Imai, Nagoya (JP)

(73) Assignee: Konica Minolta, Inc., Tokyo (JP)

( * ) Notice: Subject to any disclaimer, the term of this patent is extended or adjusted under 35 U.S.C. 154(b) by 90 days.

(21) Appl. No.: 15/482,136

(22) Filed: Apr. 7, 2017

(65) Prior Publication Data

US 2017/0295295 A1    Oct. 12, 2017

(30) Foreign Application Priority Data

Apr. 11, 2016  (JP) ................. 2016-079115

(51) Int. Cl.
*H04N 1/34* (2006.01)
*H04N 1/00* (2006.01)
*G06Q 30/04* (2012.01)

(52) U.S. Cl.
CPC ............. *H04N 1/346* (2013.01); *G06Q 30/04* (2013.01); *H04N 1/0057* (2013.01); *H04N 1/00411* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 4,206,996 A | * | 6/1980 | Clark | ................ G03G 15/5012 377/30 |
| 4,317,629 A | * | 3/1982 | Kuseski | ................ G03G 21/02 355/24 |
| 7,206,084 B2 | * | 4/2007 | Bondy | ............... H04N 1/00567 358/1.14 |

FOREIGN PATENT DOCUMENTS

| | | |
|---|---|---|
| JP | 10268721 | 10/1998 |
| JP | 11129589 | 5/1999 |
| JP | 2007-086423 | 4/2007 |
| JP | 2011-113038 | 6/2011 |

* cited by examiner

*Primary Examiner* — Paul F Payer
(74) *Attorney, Agent, or Firm* — Baker Hostetler

(57) ABSTRACT

A billing system used together with an image forming apparatus for forming an image on a sheet and discharging the sheet includes: a counting unit for counting, when a print job is interrupted, a billing unit number for a sheet which already has an image formed thereon when the interruption occurs and which has not discharged from the image forming apparatus; a determination unit for determining whether the print job is continued or cancelled after the print job is interrupted; and a billing unit for counting a billing counter corresponding to an amount for which the image forming apparatus is used, and billing a user who uses the image forming apparatus according to the billing counter, wherein the billing unit switches whether the billing counter is counted by using a count result of the counting unit in accordance with a determination result of the determination unit.

14 Claims, 13 Drawing Sheets

BILLING SYSTEM, IMAGE FORMING SYSTEM, CONTROL METHOD OF BILLING SYSTEM, AND CONTROL PROGRAM OF BILLING SYSTEM

The present application claims priority under 35 U.S.C. §119(b) to Japanese Patent Application No. 2016-079115, filed on Apr. 11, 2016, the entire disclosure of which is hereby incorporated by reference.

BACKGROUND

Field of the Invention

The present invention relates to a billing system, an image forming system, a control method of the billing system, and a control program of the billing system, and more particularly, the present invention relates to a billing system, an image forming system, a control method of the billing system, and a control program of the billing system for billing a user according to the number of times a sheet is successfully printed.

Description of the Related Art

Image forming systems such as a multi function peripheral (MFP) having a scanner function, a facsimile function, a copy function, a function as a printer, a data communication function, and a server function, and an image forming system such as a facsimile machine, a copier, and a printer, are known to include a billing system for billing a user according to printing (image forming operation). The image forming system uses the billing system to bill the user according to the number of times a sheet is successfully printed.

In the image forming system, a sheet jam may occur during printing, and the sheet may not be discharged as a normal printed material. It is not appropriate to bill the user even for the jammed sheet. Therefore, a discharged-based billing method for billing the user in accordance with a billing unit number (for example, the number of pages) for the sheets normally discharged from an image forming system is generally used as the billing method for the billing system used for such image forming system. In the discharged-based billing method, printing is performed again on a sheet which has not yet been discharged and which has not yet been billed when the image forming system recovers from the sheet jam. Since the billing is performed for the sheets that have been normally discharged from the image forming system, the same page and the like will never be billed twice before and after the occurrence of the sheet jam (double billing does not occur).

The following matters are known in relation to the relationship between the occurrence of the sheet jam and the billing state in the image forming system performing such billing.

JP 2011-113038 A indicates that an image processing apparatus calculates the excessively billed amount due to an occurrence of a jam and displays the amount on a panel so that the user can easily check the excessive amount.

JP H11-129589 A describes a configuration of an image forming apparatus which checks whether a print is executed correctly after executing the print job and cancels the billing if it is not printed correctly. The determination includes visual confirmation determination performed by the user and automatic determination based on a stop due to a jam.

JP H10-268721 A indicates that the image forming apparatus counts a sheet when the sheet having an image formed thereon is detected by a discharge detection sensor. JP H10-268721 A indicates that, in the case where the print job is interrupted, the number of image formation is counted unless it is an interruption due to a jam, and in the case where it is an interruption due to a jam, the count is not added.

JP 2007-086423 A indicates that when an image forming apparatus detects an occurrence of abnormality such as a jam, the image forming operation is cancelled, and when a sheet to be billed is present in the image forming apparatus, the image forming apparatus performs the billing processing. After the image forming apparatus performs the billing processing as described above, the image forming apparatus prevents double billing by cancelling the image forming job.

By the way, in a case where a sheet jam occurs while executing a print job for printing and outputting multiple sheets, there may be a sheet which has already been printed but which has not yet been discharged from the inside of the image forming system to the outside of the image forming system (a printed sheet). In such a case, there arises a problem when discharged-based billing is performed.

A printed sheet which has not yet been discharged and is still in the inside of the image forming system during an occurrence of a sheet jam can be retrieved from the image forming system while the print job is interrupted due to the sheet jam, so that the user may obtain the printed sheet in the same manner as a normal printing is performed. Therefore, for example, the user may do cheating to interrupt a print job by intentionally causing a sheet jam and obtain a non-discharged printed sheet even though it is not billed.

Such problem is particularly noticeable in an image forming system equipped with a purge function. The purge function is a function for discharging a sheet in the image forming system when a sheet jam occurs, so that the user can easily cope with the sheet jam. A printed sheet that has not yet been discharged when a jam occurs is discharged to a purge tray in the same manner as a normal sheet with purge operation. For this reason, the printed sheet is easily used in a fraudulent manner.

In order to cope with such problem, it may be possible to employ image formation-based billing method for billing the user for a sheet when an image formation on the sheet has been completed. In the case where the image formation-based billing is used, the printed sheet that has not yet been discharged has been billed. Therefore, the fraudulent usage explained above does not occur. However, in this case, if the print job is continuously performed after the sheet jam occurs, the printed sheet that has not yet been discharged is printed again as a result of recovery operation. As a result, there is a problem in that the printed sheet that has not yet been discharged is billed twice.

In order to prevent double billing, a printed sheet that has not yet been discharged, e.g., a printed sheet that has been purged, may be excluded from a print target during the recovery operation. However, in this case, the user is forced to perform annoying work to arrange sheets that were discharged to another tray for purging that is different from a normal discharge tray and printed sheets that were retrieved from the inside of the apparatus, so that these sheets are arranged into the original order of the pages with the normally discharged sheets.

JP 2007-086423 A indicates that when a print job is interrupted, whether a billing target sheet exists or not in the apparatus is determined, and then, the print job is cancelled upon billing a sheet that may be used in a fraudulent manner, so that both the fraudulent usage and the double billing are prevented. However, when the print job is cancelled as described above, this is inconvenient for the user.

SUMMARY

The present invention has been made to solve such a problem, and it is an object of the present invention to provide a billing system, an image forming system, a control method of the billing system, and a control program of the billing system which can prevent both the fraudulent usage and the double billing of a printed sheet, and which are highly convenient.

To achieve the abovementioned object, according to an aspect, a billing system used together with an image forming apparatus for forming an image on a sheet and discharging the sheet, reflecting one aspect of the present invention comprises: a counting unit for counting, when a print job is interrupted in the image forming apparatus, a billing unit number for a sheet which already has an image formed thereon when the interruption occurs and which has not yet discharged from the image forming apparatus; a determination unit for determining whether the print job is continued or cancelled after the print job is interrupted in the image forming apparatus; and a billing unit for counting a billing counter corresponding to an amount for which the image forming apparatus is used, and billing a user who uses the image forming apparatus according to the billing counter, wherein the billing unit switches whether the billing counter is counted by using a count result of the counting unit in accordance with a determination result of the determination unit.

The image forming apparatus preferably includes a purge function, and when a print job is interrupted in the image forming apparatus, the counting unit preferably counts a billing unit number of a sheet which is discharged from the image forming apparatus with the purge function and which has an image formed thereon.

The billing unit preferably counts the billing counter based on a billing unit number for a sheet normally discharged from the image forming apparatus.

When the determination unit determines that the print job is continued, the billing unit preferably counts the billing counter without using a count result of the counting unit.

When the determination unit determines that the print job is cancelled, the billing unit preferably counts the billing counter by adding a number counted by the counting unit to the billing unit number for the sheet normally discharged from the image forming apparatus.

The billing unit preferably counts the billing counter based on a billing unit number according to a number of times images are formed on sheets.

When the determination unit determines that the print job is continued, the billing unit preferably counts the billing counter by subtracting a count result of the counting unit from the billing unit number.

When the determination unit determines that the print job is cancelled, the billing unit preferably counts the billing counter without using a count result of the counting unit.

The determination unit preferably determines whether the print job is continued or cancelled based on an operation performed by the user.

The counting unit preferably stores a count value to a nonvolatile memory, and when a power of the image forming apparatus is turned ON, the determination unit preferably determines whether the print job is cancelled or not based on the count value stored in the nonvolatile memory.

The billing system preferably further includes a notification unit, and in a case where the billing unit counts the billing counter by using a count result of the counting unit, the notification unit notifies the user to that effect.

To achieve the abovementioned object, according to an aspect, an image forming system reflecting one aspect of the present invention comprises: an image forming apparatus including an image forming unit forming an image on a sheet and a discharge unit discharging a sheet having an image formed thereon with the image forming unit; and the billing system of any one of Items. 1 to 11.

To achieve the abovementioned object, according to an aspect, a control method of a billing system used together with an image forming apparatus for forming an image on a sheet and discharging the sheet, reflecting one aspect of the present invention comprises: a counting step of counting, when a print job is interrupted in the image forming apparatus, a billing unit number for a sheet which already has an image formed thereon when the interruption occurs and which has not yet discharged from the image forming apparatus; a determination step of determining whether the print job is continued or cancelled after the print job is interrupted in the image forming apparatus; a billing step of counting a billing counter corresponding to an amount for which the image forming apparatus is used, and billing a user who uses the image forming apparatus according to the billing counter, wherein in the billing step, whether the billing counter is counted by using a count result in the counting step is switched in accordance with a determination result in the determination step.

To achieve the abovementioned object, according to an aspect, there is provided a non-transitory recording medium storing a computer readable control program of a billing system used together with an image forming apparatus for forming an image on a sheet and discharging the sheet, and the program reflecting one aspect of the present invention causes a computer to execute: a counting step of counting, when a print job is interrupted in the image forming apparatus, a billing unit number for a sheet which already has an image formed thereon when the interruption occurs and which has not yet discharged from the image forming apparatus; a determination step of determining whether the print job is continued or cancelled after the print job is interrupted in the image forming apparatus; and a billing step of counting a billing counter corresponding to an amount for which the image forming apparatus is used, and billing a user who uses the image forming apparatus according to the billing counter, wherein in the billing step, whether the billing counter is counted by using a count result in the counting step is switched in accordance with a determination result in the determination step.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, a billing system and an image forming system using the billing system according to an embodiment of the present invention will be described with reference to the drawings. However, the scope of the invention is not limited to the illustrated examples.

The billing system is used together with the image forming apparatus for forming an image on a sheet and discharging the sheet, and the billing system constitutes an image forming system. The billing system bills the user who uses the image forming apparatus in accordance with the amount for using the image forming apparatus.

The image forming apparatus is a multi function peripheral (MFP) having a scanner function, a copy function, a printer function, a facsimile function, a data communication function, and a server function. The scanner function is a function for reading an image of a placed original document and storing the image into a hard disk drive (HDD) or the like. The copy function is a function for printing the image on a sheet. The function as a printer is a function for performing printing on a sheet based on a command when receiving a print command from an external terminal such as a PC. The facsimile function is a function for receiving facsimile data from an external facsimile apparatus and the like and storing the facsimile data into an HDD and the like. The data communication function is a function for sending and receiving data to and from a connected external device. The server function is a function for allowing data and the like stored in an HDD and the like to be shared by multiple users.

In the present embodiment, the billing system is provided inside of the image forming apparatus as a billing apparatus and is used integrally with the image forming apparatus. The compositions of the billing system and the image forming system are not limited thereto.

EMBODIMENT

Figure 1:
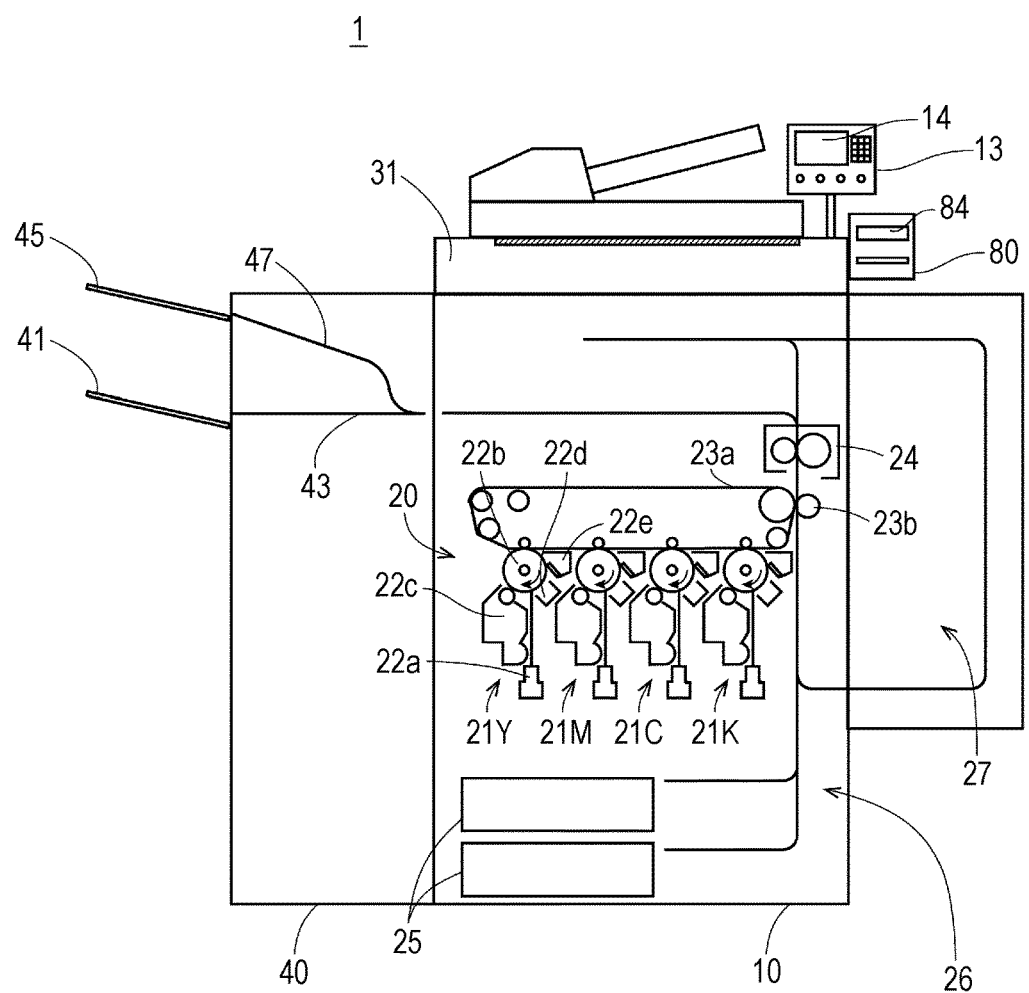
FIG. 1 is a figure illustrating a schematic configuration of an image forming apparatus according to an example of an embodiment of the present invention.

FIG. 1 is a figure illustrating a schematic configuration of an image forming apparatus according to an example of an embodiment of the present invention.

As illustrated in FIG. 1, an image forming apparatus (an example of an image forming system) 1 includes a main body 10, a post-processing apparatus 40, and a billing apparatus (an example of a billing system) 80. The main body 10 forms an image on a sheet, and conveys the sheet to the post-processing apparatus 40. The post-processing apparatus 40 performs post-processing on the sheet in the designated state, and discharges the sheet onto a discharge tray 41 provided outside of the post-processing apparatus 40. More specifically, the image forming apparatus 1 forms an image on the sheet, and discharges the sheet onto the discharge tray 41.

The main body 10 is provided with an image forming unit 20 and a scanner unit 31. A conveying unit 26 is provided inside of the main body 10. The conveying unit 26 conveys the sheet fed sheet from the sheet feeding tray 25 to the image forming unit 20 along the sheet conveying path. The conveying unit 26 has multiple conveying rollers (not shown). The conveying rollers are provided at several locations of the sheet conveying path. The conveying rollers include a registration roller, a discharge roller, and the like.

Figure 2:
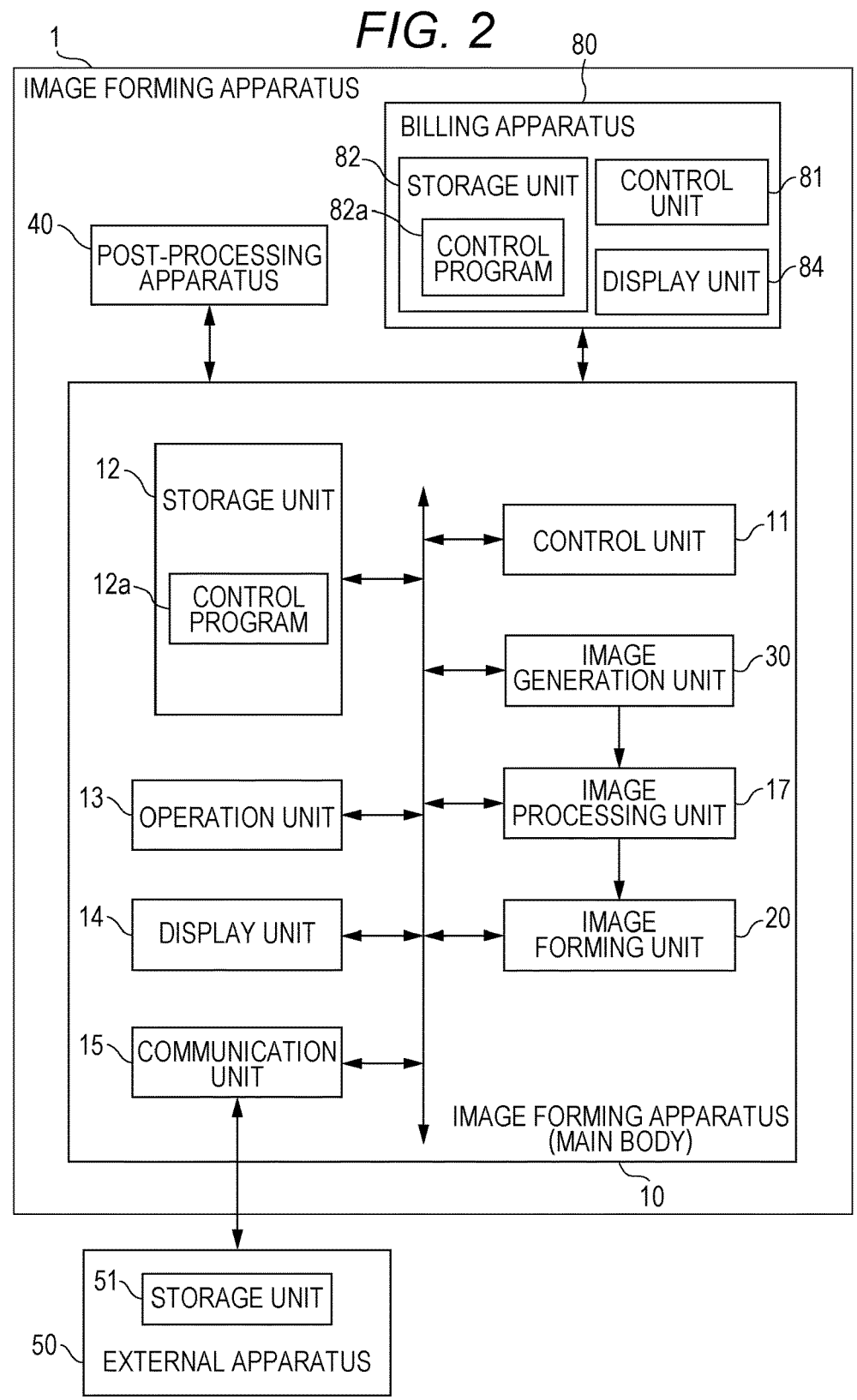
FIG. 2 is a function block diagram illustrating an image forming apparatus.

FIG. 2 is a function block diagram illustrating the image forming apparatus 1.

In FIG. 2, the main configuration of the main body 10, the post-processing apparatus 40, and the billing apparatus 80 are illustrated for each function.

As illustrated in FIG. 2, the main body 10 includes a control unit 11, a storage unit 12, an operation unit 13, a display unit (an example of a notification unit) 14, a communication unit 15, an image generation unit 30, an image processing unit 17, and an image forming unit 20. The main body 10 is connected to the external apparatus 50 on the network. The main body 10 can communicate with the external apparatus 50 via the communication unit 15.

The control unit 11 reads a control program 12a stored in the storage unit 12. The control unit 11 controls each unit of the main body 10 by executing the read control program 12a. The control unit 11 can be constituted by a central processing unit (CPU), a random access memory (RAM), or the like.

The control unit 11 executes a print job, a copy job, a scan job, and the like. At the time of execution of, for example, a print job and a copy job, the control unit 11 causes the image processing unit 17 to perform image processing on the image generated by the image generation unit 30. The control unit 11 causes the image forming unit 20 to form an image on the sheet according to the tone value of each pixel of the image that has been processed in the image processing.

The storage unit 12 stores the control program 12a, data and the like used to execute the control program 12a. The control program 12a and the information can be read by the control unit 11. The storage unit 12 can use a nonvolatile memory such as, for example, a solid state drive or a hard disk drive.

As illustrated in FIG. 1, the operation unit 13 and the display unit 14 are provided as a user interface for the main body 10.

The operation unit 13 generates an operation signal according to the operation of the user. The operation unit 13 outputs the generated operation signal to the control unit 11. Examples of the operation unit 13 include a key and a touch panel. The touch panel is integrated with the display unit 14.

The display unit 14 displays the operation screen and the like according to the command of the control unit 11. The display unit 14 may be a liquid crystal display (LCD), an organic electro luminescence display (OELD), and the like.

As illustrated in FIG. 2, the communication unit 15 communicates with the external apparatus 50 on the network. The external apparatus 50 is, for example, a user terminal, a server, another image forming apparatus, and the like. In the external apparatus 50, a storage unit 51 which is a nonvolatile memory is provided, and various kinds of information can be stored. The image forming apparatus 1 can perform various operations using the information received from the external apparatus 50, and can transmit information to the external apparatus 50 and store information in the storage unit 51.

The communication unit 15 receives data from the external apparatus 50 which is, for example, a user terminal via the network. When executing a print job, the communication unit 15 receives PDL data described in the page description language (PDL: Page Description Language).

When executing a print job, the image generation unit 30 rasterizes the PDL data received by the communication unit 15 and generates an image. The image is a bit map style image having a tone value for each pixel. The image generation unit 30 generates images for each of the colors including C (cyan), M (magenta), Y (yellow) and K (black). Tone value is a data value representing the level of tone of an image. For example, an 8-bit data value represents the level of tone from 0 to 255.

As illustrated in FIG. 1, the image generation unit 30 has a scanner unit 31 used for a copy function. More specifically, the image generation unit 30 reads the image of the original document set by the user with the scanner unit 31 at the time of executing the copy job or the scan job. The image generation unit 30 acquires the image of each of the colors including R (red), G (green) and B (blue) by reading with the scanner unit 31. The image generation unit 30 can also generate images in C, M, Y, and K by performing color conversion of the image in each color.

The image processing unit 17 performs image processing on the image generated by the image generation unit 30. The image processing includes, for example, tone processing, halftone processing, and the like. The tone processing is processing to convert the tone value of each pixel of an image into the corrected tone value. The correction is performed so that the density characteristic of the image formed on the sheet matches the target density characteristic. The halftone processing is, for example, error diffusion processing, screen processing using the ordered dither method, and the like.

The image processing unit 17 can apply image processing according to the application setting of image forming. The application settings include page allocation, page insertion, magnification change, repeat, centering, margin, image editing, stamp, color adjustment, negative/positive reversal, mirror image, frame erase, and the like. The page allocation is the process of reducing and arranging images of multiple pages on one page. The page insertion is processing to add one page of an image. The magnification change is processing to enlarge or reduce an image. The repeat is processing that places the same image on multiple pages. The centering is processing for shifting an image to the center position of the page. The binding margin is processing for shifting the position of an image to provide a binding area. The image editing is the processing for adding characters such as dates, the number of pages, and the like. The stamp is a processing for adding an image such as a watermark, a logo mark, and the like. The negative/positive inversion is a processing for inverting the luminance of the image. The mirror image is processing for converting an image into a mirror image. The frame erase is processing for deleting a frame in an image.

When executing a print job or a copy job, the image forming unit 20 forms an image consisting of multiple colors on a sheet according to the tone value of each pixel of the image processed by the image processing unit 17.

As illustrated in FIG. 1, the image forming unit 20 is provided with four writing units 21 (21Y, 21M, 21C, 21K), an intermediate transfer belt 23a, a secondary transfer roller 23b, a fixing apparatus 24, and a sheet feeding tray 25. The writing units 21 are arranged in series along the belt surface of the intermediate transfer belt 23a. The intermediate transfer belt 23a is wound around and rotated by multiple rollers. One of the multiple rollers constitutes the secondary transfer roller 23b.

The image forming unit 20 has a reversing mechanism 27 in addition to the conveying unit 26 conveying a sheet from the sheet feeding tray 25. The conveying unit 26 has conveying rollers provided at multiple locations on the sheet conveying path. The sheet feeding tray 25 accommodates sheets. The conveying unit 26 conveys a sheet from the sheet feeding tray 25 with multiple conveying rollers. On the sheet conveying path, the secondary transfer roller 23b and the fixing apparatus 24 are arranged.

The four writing units 21C, 21M, 21Y, and 21K form images in colors C, M, Y, and K, respectively. The construction of each writing unit 21 is the same. More specifically, the writing unit 21 includes an exposure unit 22a, a photosensitive member 22b, a developing unit 22c, and a charging unit 22d, and a cleaning unit 22e.

Each writing unit 21 forms an image of each color as follows. More specifically, the charging unit 22d applies a voltage to the photosensitive member 22b to charge the photosensitive member 22b. The exposure unit 22a irradiates a laser beam according to the tone value of each pixel of the image in each of the colors C, M, Y, and K, and exposes the photosensitive member 22b. The developing unit 22c supplies a coloring material such as a toner to the photosensitive member 22b, and develops an electrostatic latent image formed on the photosensitive member 22b. Then, images of each of the colors are formed on the photosensitive member 22b of each of the writing units 21.

The images on the photosensitive members 22b are sequentially overlapped and transferred onto the intermediate transfer belt 23a, and an image composed of multiple colors is formed on the intermediate transfer belt 23a. After the transfer of the image to the intermediate transfer belt 23a, each writing unit 21 removes the coloring material remaining on the photosensitive member 22b with the cleaning unit 22e.

The sheet feeding tray 25 feeds sheets. The sheet is conveyed along the sheet conveying path by the conveying unit 26. The secondary transfer roller 23b transfers an image composed of multiple colors on the intermediate transfer belt 23a onto the sheet. The sheet is conveyed to the fixing apparatus 24. The fixing apparatus 24 heats and pressurizes the sheet. As a result, the image is fixed to the sheet. As a result, the image is formed on the sheet (image formation is completed). Thereafter, the sheet on which the image is formed is fed to the post-processing apparatus 40 by the discharge roller.

In the case where images are formed on both sides of the sheet, the sheet is conveyed to the reversing mechanism 27 after the image is fixed. The reversing mechanism 27 reverses the sheet surface with a conveying roller, and conveys the sheet to the secondary transfer roller 23b again. As a result, an image is formed on the opposite side of the sheet.

The post-processing apparatus 40 includes, for example, a punching unit (not shown) and a stapling unit (not shown). The post-processing apparatus 40 performs corresponding post-processing (for example, punching processing, stapling processing) according to the contents of the print job. Inside the post-processing apparatus 40, a normal conveying path 43 for sheets is provided. The post-processing apparatus 40 performs post-processing as necessary while conveying the sheet conveyed from the main body 10 on the conveying path 43. Then, the post-processing apparatus 40 discharges the sheet from the conveying path 43 onto the discharge tray 41.

The post-processing apparatus 40 and the main body 10 are connected so as to be able to communicate with each other. The post-processing apparatus 40 operates in synchronization with the main body 10 based on the control of the control unit 11.

[Explanation about Billing Apparatus 80]

The billing apparatus 80 includes a control unit 81 (an example of a counting unit, an example of a determination unit, an example of a billing unit, an example of a notification unit), a storage unit 82, and a display unit 84. The billing apparatus 80 is additionally connected to the main body 10 of the image forming apparatus 1 and used together with the main body 10.

The control unit 81 communicates with the control unit 11 of the main body 10 and controls the operation of each unit of the billing apparatus 80 by cooperating with the operation of the main body 10.

The display unit 84 displays the operation status of the billing apparatus 80 based on the control of the control unit 81. The display unit 84 is, for example, a liquid crystal display (LCD), but is not limited to thereto. For example, the display unit 84 may be a light emitting unit which is controlled to emit light according to a predetermined operation. Alternatively, the display unit 84 may not be provided.

The storage unit 82 is a nonvolatile memory such as, for example, a flash memory, and stores various kinds of information. The storage unit 82 stores the control program 82a of the billing apparatus 80. The control unit 81 reads and executes the control program 82a, so that the control is performed by the control unit 81.

The storage unit 82 stores the information about the billing counter used when billing the user who uses the image forming apparatus 1 and the count value of the purged sheets as described later.

The control unit 81 may store information by using the storage unit 12 of the main body 10. In this case, the storage unit 82 is not necessary.

In the present embodiment, the billing apparatus 80 receives cash or prepaid cards from the user. Then, by using the received amount as the balance, the billing apparatus 80 performs processing to reduce the balance according to the amount of the use of the image forming apparatus 1 by the user, so that the user is billed. Such billing processing is performed based on the control of the control unit 81. The billing apparatus 80 may perform the billing processing for identifying the user of the image forming apparatus 1, and updates and holds the billing information corresponding to the account information of the user in accordance with the usage amount.

The billing processing is performed based on the billing counter counted by the control unit 81 corresponding to the amount of use of the image forming apparatus 1. In the present embodiment, the billing counter is counted in units of the number of pages (an example of a billing unit number) of the printed sheet. More specifically, when single-sided printing is performed on a sheet, one is counted as the number of billing counters (the billing counter is incremented by one). When double-sided printing for four pages is performed on two sheets, the billing counter is increased by four. The control unit 81 obtains the information about the number of pages printed from the control unit 11 of the main body 10, and counts the billing counter. The amount billed to the user is the amount obtained by multiplying the count number of the billing counter by the unit price per page.

[Explanation about Purge Operation]

In the present embodiment, the image forming apparatus 1 has a function of performing purge operation. The purge operation is an operation for discharging, from the image forming apparatus 1, a sheet conveyed in the image forming apparatus 1 when a print job is interrupted. When an abnormality such as, for example, a sheet jam occurs while a print job is being performed, the control unit 11 interrupts the print job. In order to make the image forming apparatus 1 be ready for printing again when the print job is interrupted, it is necessary to remove the sheet being conveyed in the image forming apparatus 1. The purge operation is carried out by driving each unit of the image forming apparatus 1 to an extent in view of the content of the abnormality that occurs in the image forming apparatus 1. A purge operation is performed to purge the sheet which was being conveyed at the time of interruption of the print job, so that the sheet can be discharged from the image forming apparatus 1, and the image forming apparatus 1 can be easily restored back to the printable state again.

The purge operation is performed based on the control of control unit 11. As illustrated in FIG. 1, the post-processing apparatus 40 is provided with a purge path 47 so as to branch from the conveying path 43. The sheet discharged by the purge operation is guided to purge path 47. The sheet guided to the purge path 47 is discharged onto the purge tray 45 via the purge path 47. This makes it easy to distinguish the sheet discharged to discharge tray 41 by normal operation and the sheet discharged to the purge tray 45 by the purge operation.

When, for example, a restoration work for dealing with an abnormality that occurred in the case where the print job is interrupted, the image forming apparatus 1 is restored back to the printable state. Then, the control unit 11 prints again a sheet that has not been discharged from the image forming apparatus 1 when the print job is interrupted. More specifically, in the case where the purge operation is performed, the sheet discharged to the purge tray 45 is not treated as a normally discharged sheet. Then, when the print job is continuously performed (resumed), printing is performed again to print the sheet that has not been properly discharged.

Figure 3:
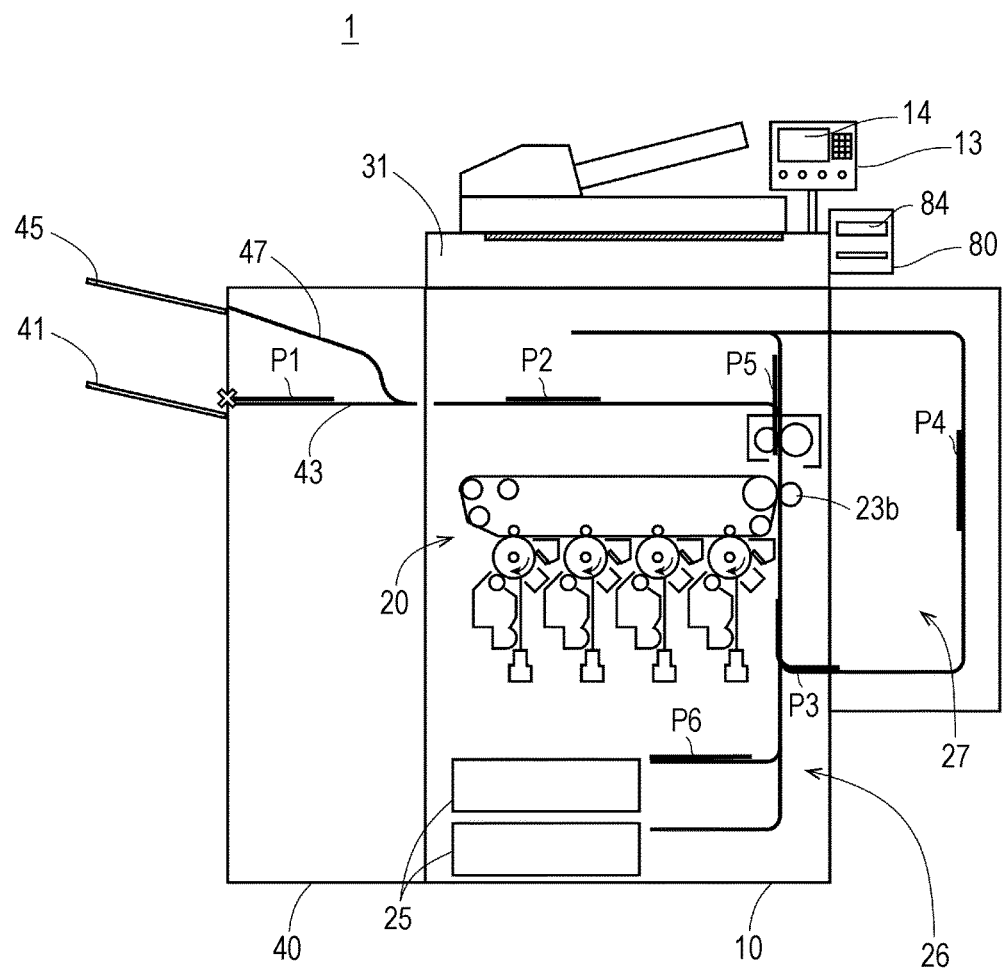
FIG. 3 is a figure for explaining an example of a status when a print job is interrupted.

FIG. 3 is a figure for explaining an example of a status when a print job is interrupted.

FIG. 3 illustrates, for example, a print job is performed to form images with double-sided printing on six sheets, i.e., sheets P1 to P6. In the post-processing apparatus 40, it is assumed that a sheet jam occurs near the discharge port to the discharge tray 41. When a sheet jam occurs, the print job is interrupted based on the control of the control unit 11, and the operation of image forming apparatus 1 is stopped.

In the state illustrated in FIG. 3, a sheet jam occurs at a conveying-direction front end portion of the sheet P1 indicated by X in the figure. At this occasion, the sheet P2 is in a state immediately before the sheet P2 is fed from the main body 10 after images are formed on both sides thereof. The sheet P3 and sheet P4 are in a state in which an image is formed on one side thereof and the sheets P3 and P4 are reversed by the reversing mechanism 27. The sheet P5 is in a state in which the sheet P5 has passes through the fixing apparatus 24, and the image is formed on one side thereof. The sheet P6 is in a state in which the sheet P6 has just been fed from the sheet feeding tray 25, and the image is not formed thereon.

In the main body 10, an abnormality such as a sheet jam does not occur. In this state, the sheets P2 to P6 at the upstream side in the conveying direction with respect to the purge path are to be purged in the purge operation.

Figure 4:
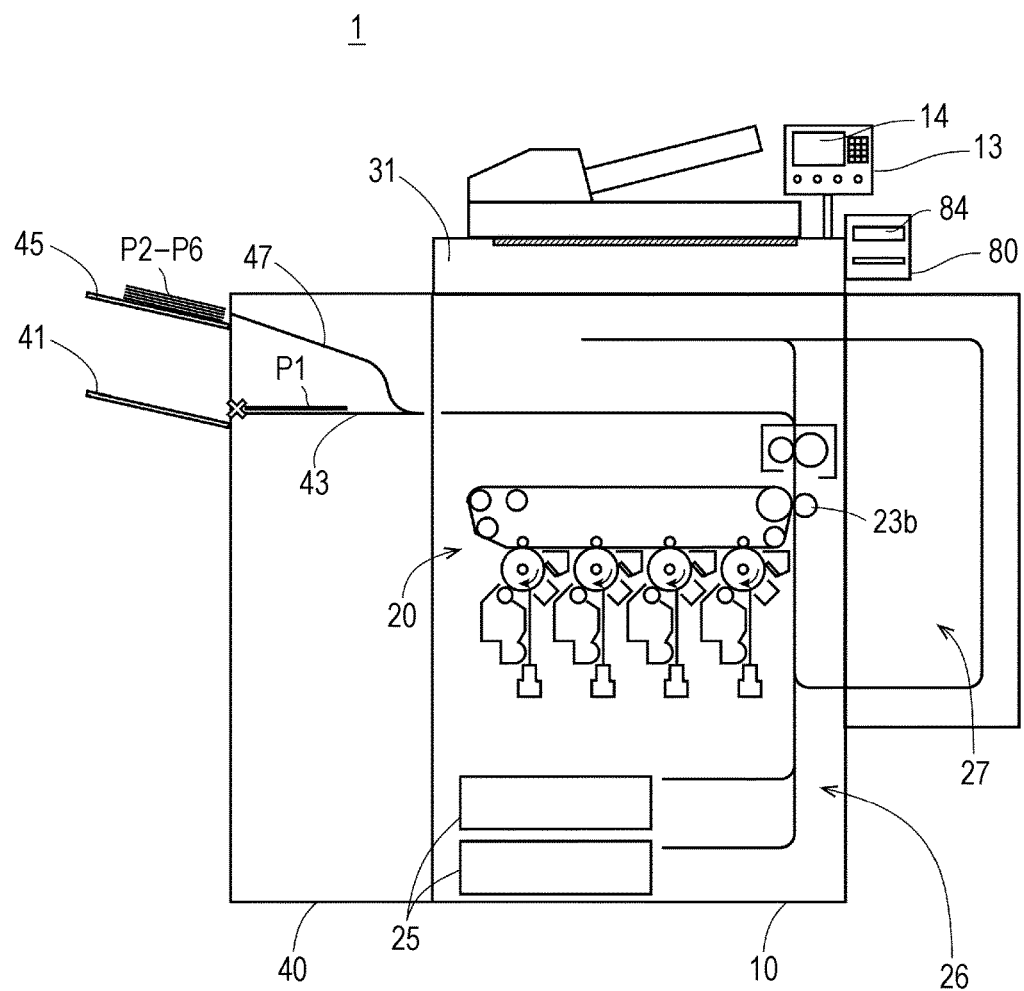
FIG. 4 is a figure illustrating an example of a state in which a purge operation is performed.

FIG. 4 is a figure illustrating an example of a state in which a purge operation is performed.

As illustrated in FIG. 4, when the purge operation is performed, the sheets P2 to P6 are fed from the main body 10 to the post-processing apparatus 40 via the sheet conveying path in the main body 10. The fed sheets P2 to P6 are guided to the purge path 47 and sequentially discharged onto the purge tray 45. The sheet P1 supported in the post-processing apparatus 40 as a result of sheet jam stays on the conveying path 43.

Since the sheets P2 to P6 that can be discharged by the purge operation are discharged to the purge tray 45 in this manner, the image forming apparatus 1 can be made into a state ready to perform printing again in an easy and quick manner by just performing the work for removing the sheet P1 in the apparatus.

[Explanation about Operation of Billing when Print Job is Interrupted]

In this case, in the present embodiment, when the print job is interrupted as a result of an occurrence of a sheet jam or the like, the number of printed pages of sheets not normally discharged from the image forming apparatus 1 is counted. Then, the billing counter is counted according to the count value and the subsequent consequence of the print job. The processing related to such billing is performed by the control unit 81.

Figure 5:
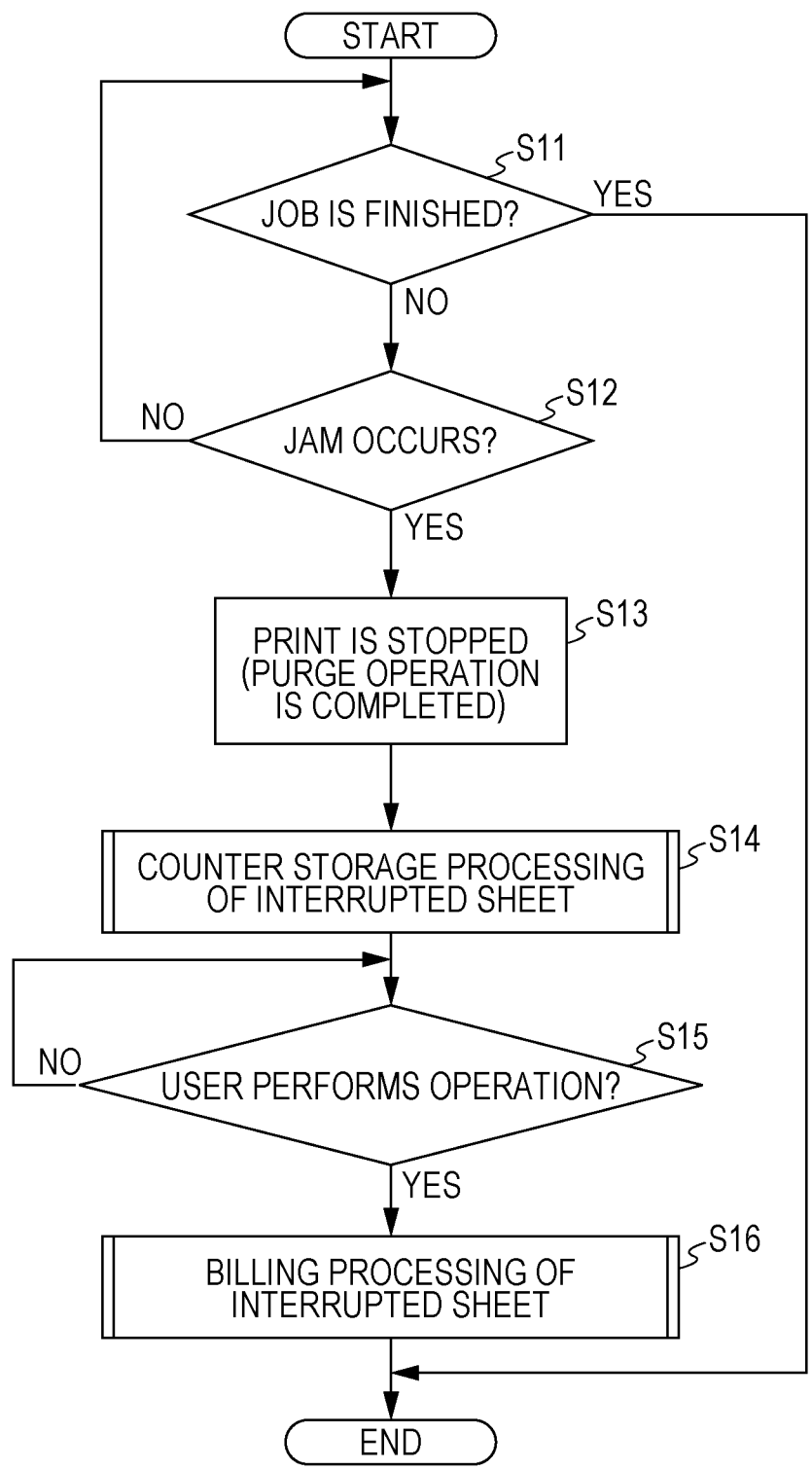
FIG. 5 is a flowchart illustrating an operation of an image forming apparatus when a print job is executed.

FIG. 5 is a flowchart illustrating an operation of the image forming apparatus 1 when a print job is executed.

In step S11, the control unit 11 of the image forming apparatus 1 determines whether or not the job has ended while executing the print job. In a case where the print job has been finished, the processing is terminated.

In step S12, the control unit 11 determines whether or not a sheet jam, which is the cause of interruption of the print job, has occurred. In a case where a sheet jam does not occur, the processing of step S11 and step S12 is continuously performed. When a sheet jam occurs, the control unit 11 proceeds to the processing in step S13.

In step S13, the control unit 11 interrupts the print job. In addition, the control unit 11 executes the purge operation and purges the sheet inside of the image forming apparatus 1 to the purge tray 45 as much as possible.

In step S14, the control unit 81 of the billing apparatus 80 performs counter storage processing of the interrupted sheet.

In the counter storage processing of the interrupted sheet, when the print job is interrupted, the control unit 81 counts the number of pages, which is to be billed, of the sheets which have images formed thereon and which have not yet been discharged from the image forming apparatus 1. In particular, in the present embodiment, the count of the number of pages is performed by counting the number of pages of the sheets which have been discharged from the image forming apparatus 1 with the purge operation and which have images formed thereon. The count value obtained from the count result is stored into the storage unit 82.

In step S15, the operation of user about the consequence of the print job is received.

More specifically, for example, an operation for selecting whether to continue (resume) or cancel the interrupted print job is received. For example, an operation of the user performed with the operation unit 13 is received. When an operation such as deletion of a print job is performed with an external apparatus such as a personal computer connected to the image forming apparatus 1, the operation is received by the image forming apparatus 1.

Upon receipt of the operation of user, the control unit 11 proceeds to the processing in step S16. In step S16, the control unit 81 performs the billing processing of the interrupted sheet.

In the billing processing of the interrupted sheet, billing counter is counted by using the count value stored in the counter storage processing of the interrupted sheets as necessary so as to eliminate a possibility of an occurrence of double billing and a possibility of fraudulent usage. At this occasion, the control unit 81 determines whether the interrupted print job has been continued (resumed) or canceled, based on the operation of the user received in step S15. Then, whether or not to count the billing counter using the count result is switched according to the determination result.

Upon completion of the processing of step S16, a series of processing is finished. Thereafter, in accordance with the operation of user received in step S15, the print job is resumed and the print job is canceled.

In this case, in the present embodiment, two types of timings can be considered as the timing for counting the billing counter when the print job is performed normally.

First, a method for billing the normally discharged sheets (discharged-based billing) when the sheets are normally discharged may be considered.

On the other hand, a method for billing the sheets having the images formed thereon (image formation-based billing) when the images have been formed on the sheets (for example, a sheet having an image formed thereon passes through the fixing apparatus 24) may be considered. In this case, the billing counter is counted based on the number of times images are formed on sheets (the number of pages).

The operations in such two cases will be described below.

[Operation in Case of Discharged-Based Billing (Billing Only Normally Discharged Sheet)]

In the case where discharged-based billing is performed, printed sheets remaining inside of the image forming apparatus 1 when the print job is interrupted (also referred to as interrupted sheets) are not billed. In the case where a purge operation is performed, the purged and interrupted sheet has not been billed. In such case, a printed sheet may be used in a fraudulent manner without being billed, which raises a problem. Therefore, in the present embodiment, the processing is performed as follows.

Figure 6:
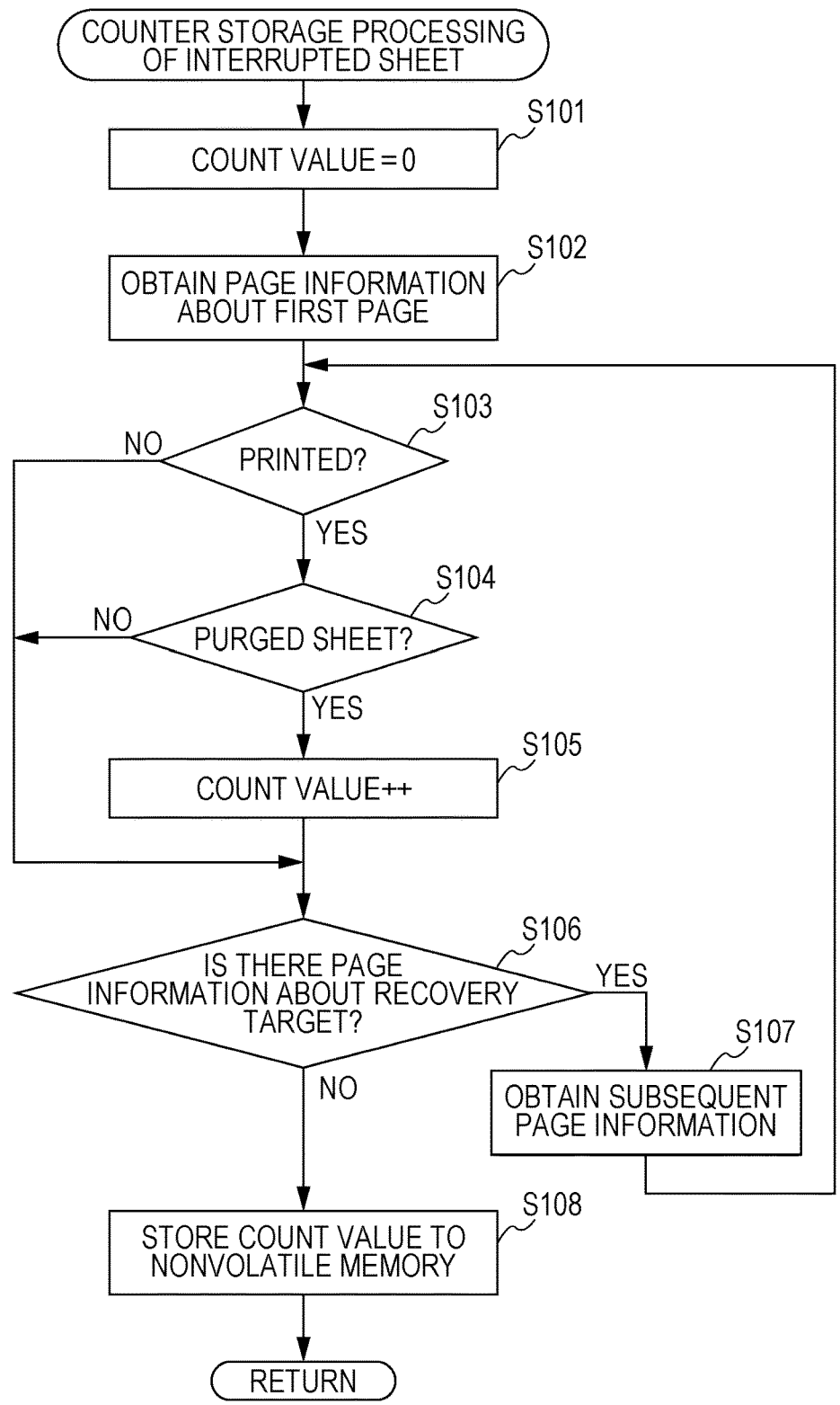
FIG. 6 is a flowchart illustrating counter storage processing of an interrupted sheet in a case where discharged-based billing is performed.

FIG. 6 is a flowchart illustrating counter storage processing of an interrupted sheet in a case where discharged-based billing is performed.

The counter storage processing of the interrupted sheet is carried out as shown in FIG. 6 based on the control of the control unit 81.

More specifically, in step S101, the count value for the count of the interrupted sheets is set to zero.

In step S102, information about a page which is one of the pages of the sheets to be recovered (sheets P1 to P6 in the example shown in FIG. 3) and which is to be processed first is obtained. The information can be obtained from the main body 10.

In step S103, a determination is made as to whether or not an image has been formed (whether or not the page has been printed) for the page for which information has been obtained. In the case where the printing has been completed, a determination is made as to whether the sheet having the page printed thereon is a sheet (purged sheet) purged in the purge operation in step S104.

When the sheet is determined not to be printed in step S103 or the sheet is determined not to be the purged sheet in step S104, the processing in step S106 is subsequently performed.

When the sheet is determined to be the purged sheet in step S104, the count value is incremented in step S105. When the count value is increased, the processing in step S106 is subsequently performed.

In step S106, a determination is made as to whether or not there still remains any sheet which is to be recovered and of which page has not yet been processed in the processing from step S103. In the case where such sheet still remains, information about a page which is to be subsequently processed is obtained in step S107. Thereafter, the processing in steps S103 to S105 is performed for the page. Such operations are repeated for all pages that have not been processed.

When there does not remain any unprocessed page in step S106, the count value is stored to the storage unit 82 in step S108. When the count value is stored, the counter storage processing of the interrupted sheet is terminated.

When the counter storage processing of the interrupted sheet is performed in the status as illustrated in FIG. 3 explained above, the count number of the sheet P2 is two, and the count number for each of the sheet P3, the sheet P4, and the sheet P5 is one, and the counting is not performed for the sheet P6. As a result, five is stored as the count value.

As described above, in the present embodiment, the number of pages of interrupted sheets that may be used in a fraudulent manner is counted in the counter storage processing of the interrupted sheet. A sheet which is not printed or a sheet which is left inside of the image forming apparatus 1 without being purged and which may be damaged are not counted. Such sheets would not be used in a fraudulent manner, or the chance of fraudulent use of such sheets is low.

Figure 7:
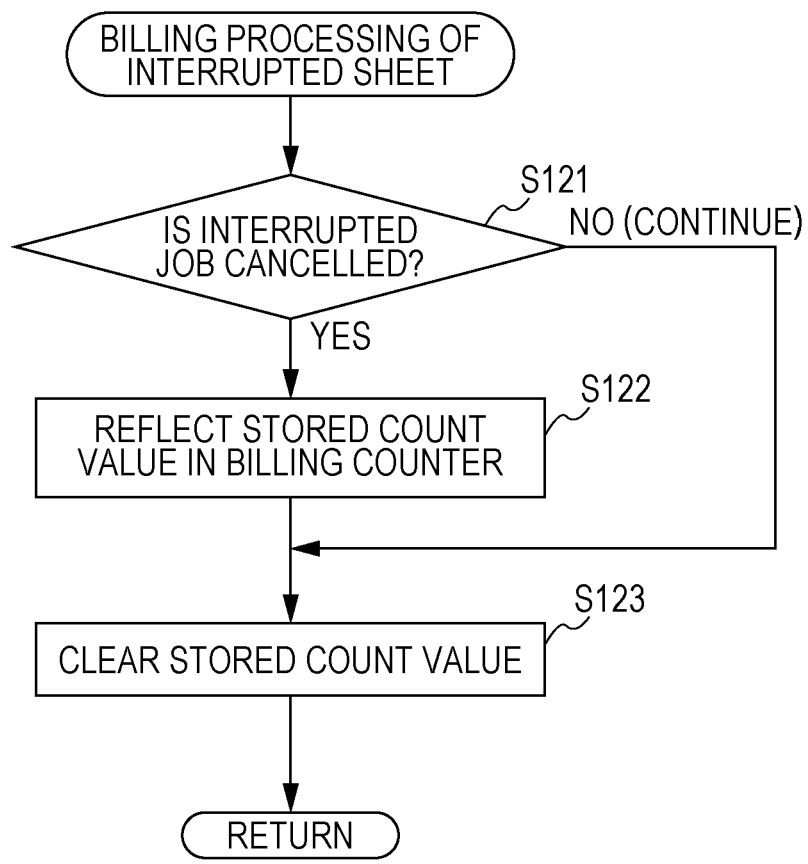
FIG. 7 is a flowchart of billing processing of an interrupted sheet in a case where discharged-based billing is performed.

FIG. 7 is a flowchart of billing processing of an interrupted sheet in a case where discharged-based billing is performed.

The billing processing of the interrupted sheet is carried out as illustrated in FIG. 7 based on the control of the control unit 81.

As illustrated in FIG. 7, when the billing processing is started, a determination is made as to whether the interrupted print job has been canceled or continued (resumed) in step S121. The determination is made based on the operation of the user received in step S15 of FIG. 5. It should be noted that the present embodiment is not limited thereto. For example, cancellation or continuation of the print job may be automatically determined from various statuses by the main body 10, and the control unit 81 may make a determination based on the determined contents or the like.

In the case where the print job is determined to be cancelled in step S121, the processing in step S122 is subsequently performed. In step S122, the processing for reflecting, in the billing counter, the count value stored in the storage unit 82 is performed. More specifically, the counting processing for increasing the billing counter by the count value is performed. Thereafter, in step S123, the control unit 81 clears the count value stored in the storage unit 82.

In the case where the sheet discharged to the purge tray 45 contains a sheet having an image formed thereon, the user can use the sheet having the image formed thereon in the same manner as the sheet normally discharged on the discharge tray 41. Therefore, in the case where the print job is canceled, the counter value corresponding to the number of pages of such sheets is reflected in the billing counter, so that this prevents fraudulent usage.

On the other hand, in the case where the print job is determined not to be cancelled (determined to be continued) in step S121, the processing in step S122 is not performed, and the processing in step S123 is subsequently performed. The control unit 81 clears the count value without using the count value. More specifically, in this case, the count value is not used for counting the billing counter.

When the print job is continued, the printing is performed on the sheet which was not normally discharged in the recovery operation, and therefore, the user would not think of using the interrupted sheet. Since the billing is done when a successful print is performed after the continuation operation of the print job is started, the sheet is not billed twice. More specifically, the user who executed the print job gets the sheet on which the image is normally formed and which has been discharged, and the billing is performed for the correct amount.

When the processing of step S123 is completed, the processing related to the billing for the case of interruption of the print job is terminated.

When the power of the image forming apparatus 1 is turned from OFF to ON, the processing based on the control of the control unit 81 is performed as follows. When the print job is interrupted, it may be possible for the user to turn OFF the power of the image forming apparatus 1 temporarily in order to recover from that status. Even when the power of the image forming apparatus 1 is turned ON again in such a case, the processing such as the following is performed so that fraudulent usage can be prevented while preventing double billing.

Figure 8:
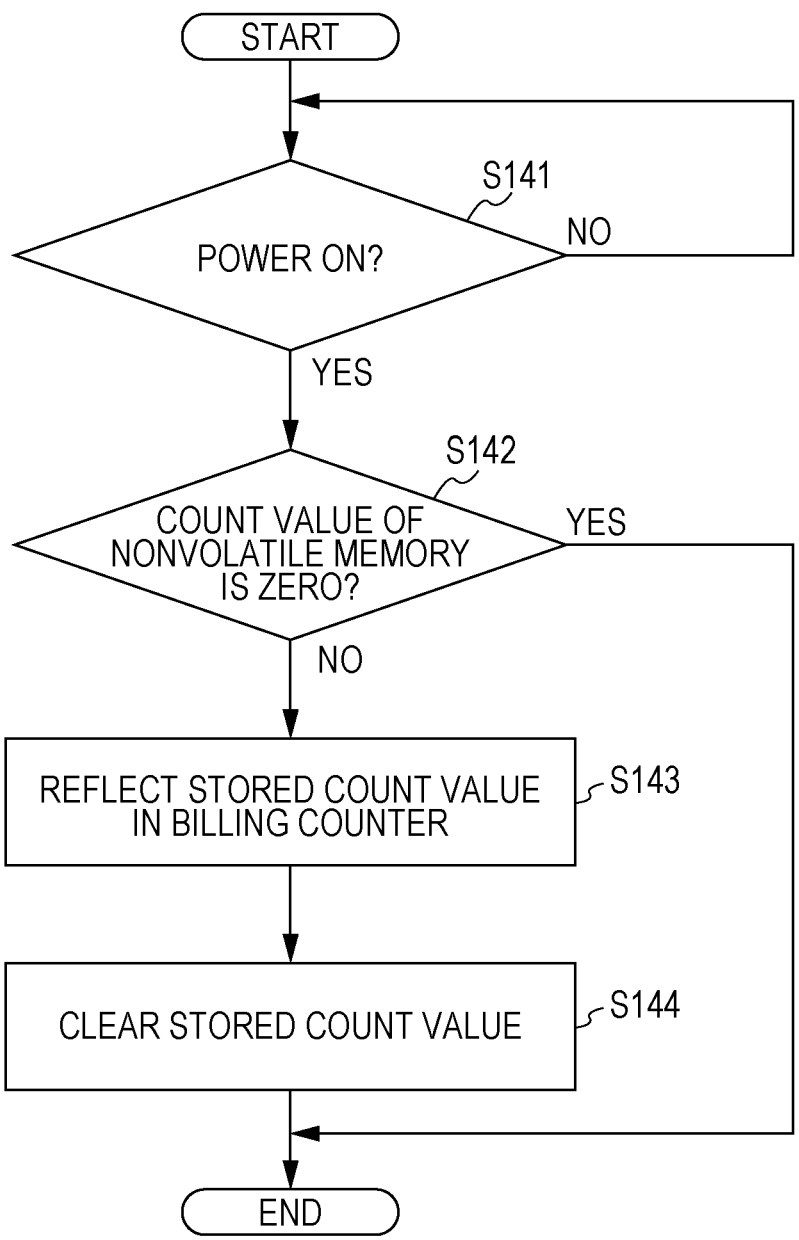
FIG. 8 is a figure for explaining billing processing of an interrupted sheet in a case where the power of the image forming apparatus is turned ON in a case where discharged-based billing is performed.

FIG. 8 is a figure for explaining billing processing of an interrupted sheet in a case where the power of the image forming apparatus 1 is turned ON in a case where discharged-based billing is performed.

As illustrated in FIG. 8, in step S141, a determination is made as to whether the power is turned ON or not.

When the power is ON, a determination is made as to whether or not the count value stored in the storage unit 82 which is a nonvolatile memory is zero which is the initial value in step S142.

In the present embodiment, the control unit 81 determines whether the print job has been continued or canceled based on the count value stored in the storage unit 82. More specifically, the fact that the count value is not zero which is the initial value indicates that when the print processing is interrupted and the counter storage processing of the interrupted sheet is performed, the power of the image forming apparatus 1 is turned OFF without performing the billing processing of the interrupted sheet. In such case, the control unit 81 determines that the operation to cancel the print job is performed by the user, and performs the same processing as the billing processing of the interrupted sheet. On the other hand, when the count value is zero which is the initial value, a special counting of the billing counter is not performed (the processing in FIG. 8 is terminated as it is).

When it is determined in step S142 that the count value is not zero, the control unit 81 performs processing of step S122 and step S123 illustrated in FIG. 7 described above. More specifically, the billing counter is counted using count value (the count value is added to the billing counter), then the count value is cleared to zero.

As described above, since the processing is performed based on the count value stored in the storage unit 82 at the time of power-on of the image forming apparatus 1, fraudulent usage can be prevented. More specifically, when the user performs an operation to turn off the power after interrupting the print job, the operation is assumed to be an operation for cancelling the print job, and the interrupted sheet can be billed based on the count value.

In the present embodiment, when the billing counter is counted using the count value, the user is notified to that effect. The notification is performed by, for example, displaying a notification screen on the display unit 14 of the main body 10. The notification screen is displayed by causing the control unit 11 to control the main body 10 based on the command of the control unit 81.

Figure 9:
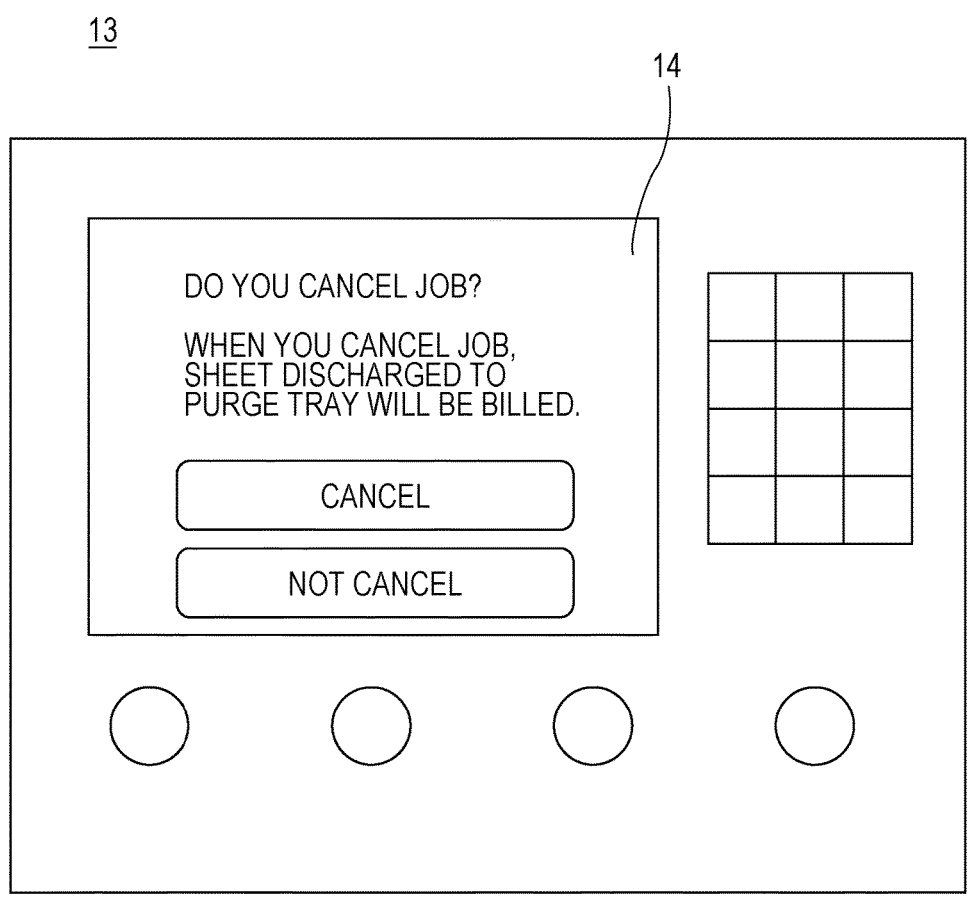
FIG. 9 is a figure illustrating an example of a notification screen.

FIG. 9 is a figure illustrating an example of a notification screen.

As illustrated in FIG. 9, the notification screen displayed on the display unit 14 also serves as a selection screen asking the user as to whether to cancel (continue) the print job or not. In the notification screen, when an operation to cancel the print job is performed, the billing counter is counted by using the count value, and a message is displayed to indicate that the interrupted sheet is billed.

The notification screen does not have to also serve as the selection screen. The selection screen may notify that the billing counter is counted by using the count value after a command for canceling the print job is performed by a user.

The notification is not limited to a notification given by displaying such a notification screen. Alternatively, a notification may be given by displaying a message indicating that the billing is performed on the display unit 84 of the billing apparatus 80. A notification may be given by outputting light or sound with the main body 10 and the billing apparatus 80. The notification may be given by sending information, in such a manner that the user can recognize the information, to the external device connected to the image forming apparatus 1.

The notification is given as described above, so that the user can recognize that billing is performed.

As illustrated in FIG. 9, when a print job is canceled before selecting whether to cancel or continue an interrupted print job, a message indicating that the interrupted sheet is billed is notified, so that the print job can be cancelled while the user recognizes the billing operation.

[Operation in a Case where Image Formation-Based Billing is Performed (Billing is Performed when Image Formation is Completed)]

In a case where the image formation-based billing is performed, a printed sheet remaining inside of the image forming apparatus 1 when a print job is interrupted (interrupted sheet) is billed. The interrupted sheet that has been purged in the case where the purge operation is performed is billed. Therefore, even when the interrupted sheet is used, the interrupted sheet is not used in a fraudulent manner, which does not raise any problem. However, when an interrupted sheet is printed again and billed in the recovery operation when the print job is continued, double billing occurs, which raises a problem. Therefore, in the present embodiment, the processing is performed as follows.

Figure 10:
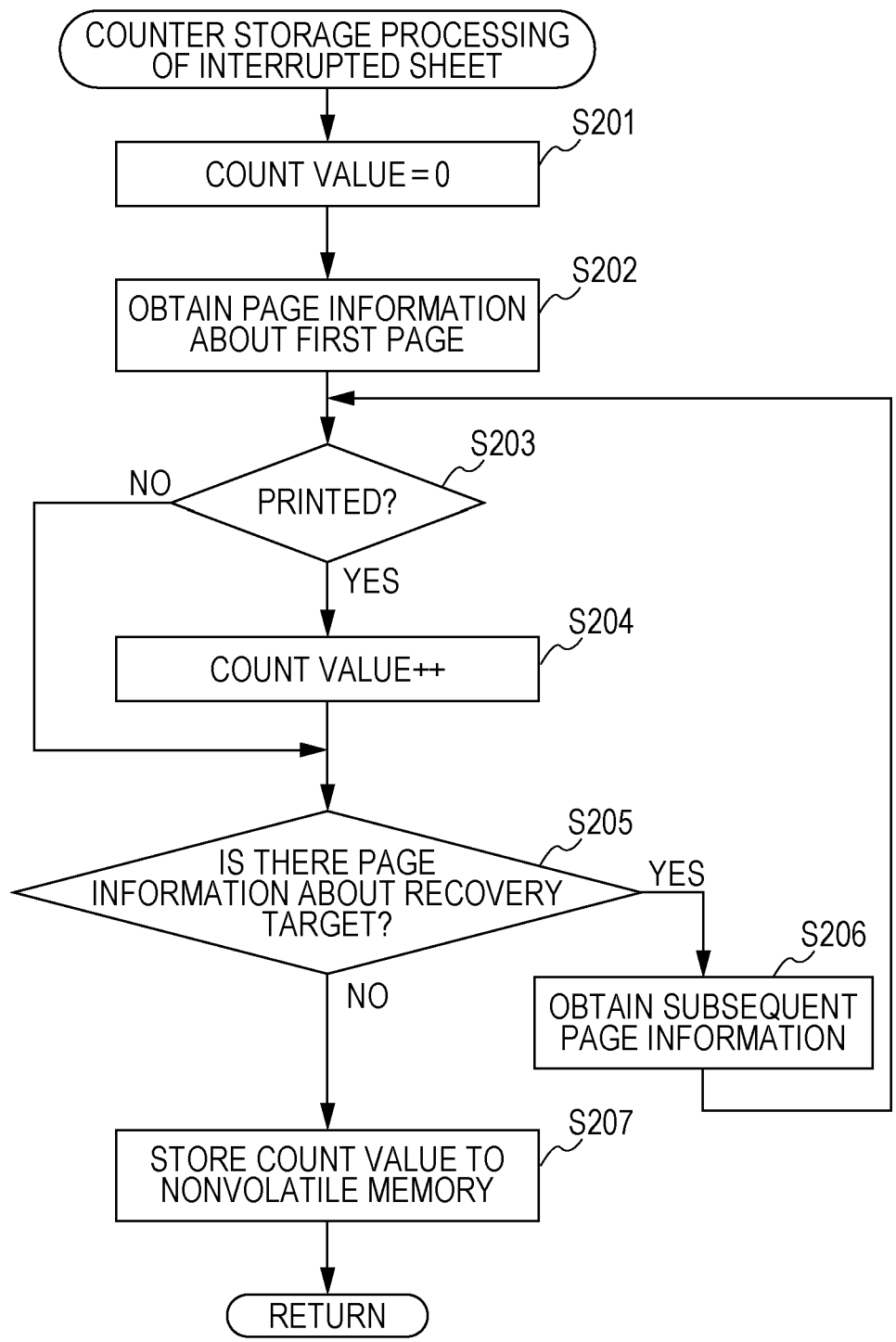
FIG. 10 is a flowchart illustrating the counter storage processing of the interrupted sheet in a case where the image formation-based billing is performed.

FIG. 10 is a flowchart illustrating the counter storage processing of the interrupted sheet in a case where the image formation-based billing is performed.

The counter storage processing of the interrupted sheet is performed as illustrated in FIG. 10 based on the control of the control unit 81.

The processing from step S201 to step S203 is the same as the processing from step S101 to step S103 in FIG. 6. Therefore, description thereabout is omitted.

In a case where the sheet is determined to have been printed in step S203, the count value is increased in step S204. When the count value is increased, the processing in step S205 is subsequently performed.

On the other hand, in a case where the sheet is determined not to have been printed in step S203, the processing in step S205 is subsequently performed.

The processing in step S205 and step S206 is the same as the processing in step S106 and step S107 in FIG. 6. The processing in step S207 is the same as the processing in step S108 in FIG. 6. The processing is performed as described above, so that the count value for the interrupted sheet is stored to the storage unit 82, and the counter storage processing of the interrupted sheet is terminated.

When the counter storage processing of the interrupted sheet is performed in the status as illustrated in FIG. 3 explained above, the count number of the sheet P2 is two, and the count number for each of the sheet P3, the sheet P4, and the sheet P5 is one, and the counting is not performed for the sheet P6. As a result, five is stored as the count value.

In the counter storage processing of the interrupted sheet, the number of pages of printed sheets which may be printed again to cause double billing in the case where the print job is continued is counted. A double billing will not occur for a sheet that is not printed, and therefore, the sheet that is not printed is not counted.

Figure 11:
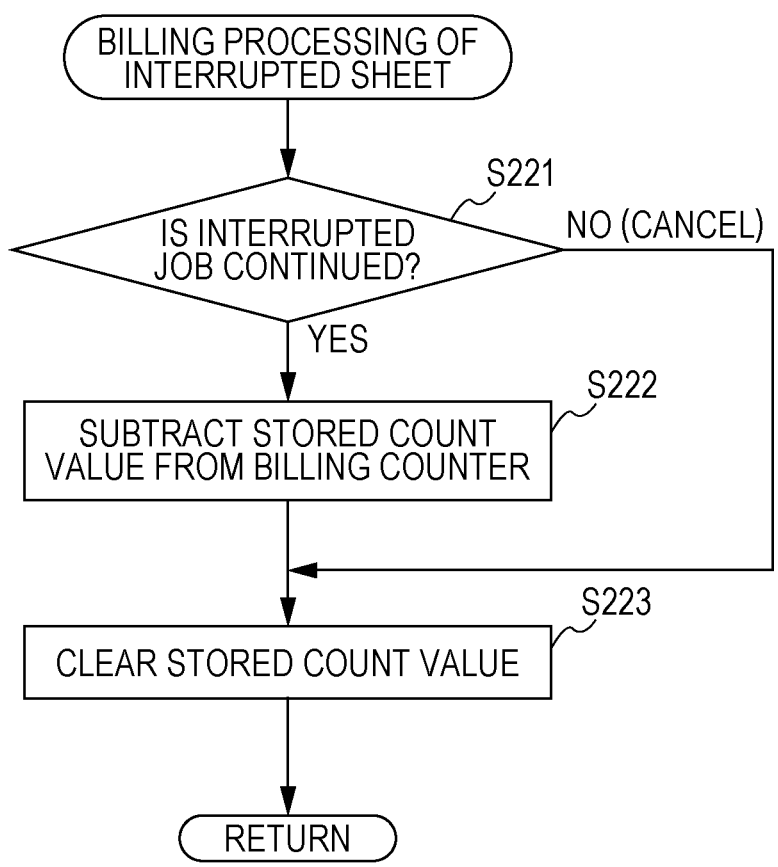
FIG. 11 is a flowchart illustrating billing processing of an interrupted sheet in a case where the image formation-based billing is performed.

FIG. 11 is a flowchart illustrating billing processing of an interrupted sheet in a case where the image formation-based billing is performed.

The billing processing of the interrupted sheet is performed as illustrated in FIG. 11 based on the control of the control unit 81.

When the billing processing is started as illustrated in FIG. 11, a determination is made as to whether an interrupted print job is continued or cancelled in step S221. The determination is made based on the operation of the user received in step S15 of FIG. 5, but the present embodiment is not limited thereto. For example, cancellation or continuation of the print job may be automatically determined from various statuses by the main body 10, and the control unit 81 may make a determination based on the determined contents or the like.

In the case where the print job is determined to be continued in step S221, the processing in step S222 is subsequently performed. In step S222, the processing of counting the billing counter is performed by using the count value stored in the storage unit 82. More specifically, the counting processing for subtracting the count value from the billing counter is performed. Thereafter, in step S223, the control unit 81 clears the count value stored in the storage unit 82.

When the print job is resumed, the print operation is performed also on the interrupted sheet that has already been billed. For this reason, the number of pages (the number of times of billing) of interrupted sheets is counted, and the recovery operation is performed upon subtracting the counter value from the billing counter, so that double billing can be prevented. As a result, the user who executed the print job gets the sheet which has the image normally printed thereon and which has been discharged, and the billing is performed for an appropriate amount.

On the other hand, the print job is determined not to be continued (cancelled) in step S221, the processing in step S222 is not performed, and the processing in step S223 is subsequently performed. The control unit 81 clears the count value without using the count value. More specifically, in this case, the count value is not used for the counting of the billing counter.

When the print job is canceled, the user can use the interrupted sheet, but it is not necessary to perform any special processing since the interrupted sheet has already been billed. Therefore, processing for simply clearing the count value is performed.

When the processing in step S223 is finished, the processing for the billing for the case where the print job is interrupted is terminated.

When the power of the image forming apparatus 1 is turned from OFF to ON, the processing based on the control of the control unit 81 is performed as follows. When the print job is interrupted, it may be possible for the user to turn OFF the power of the image forming apparatus 1 temporarily in order to recover from that status. Even when the power of the image forming apparatus 1 is turned ON again in such a case, the processing such as the following is performed so that fraudulent usage can be prevented while preventing double billing by performing accurate billing.

Figure 12:
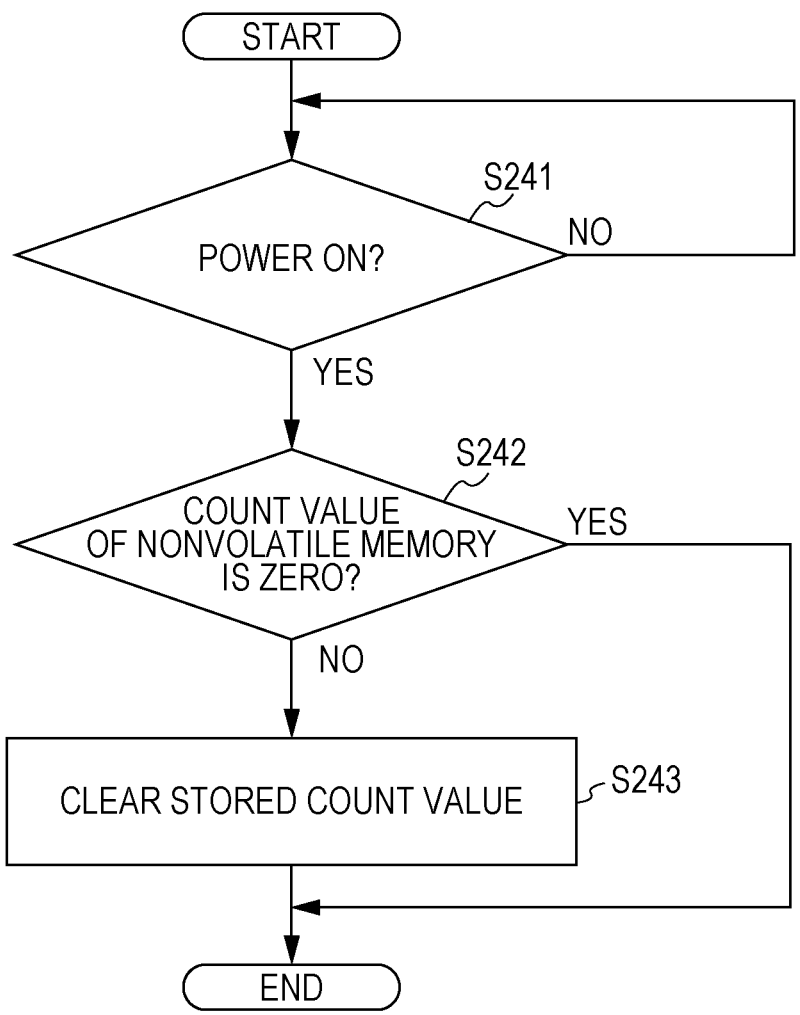
FIG. 12 is a figure for explaining billing processing of an interrupted sheet in a case where the power of the image forming apparatus is turned ON in a case where image formation-based billing is performed.

FIG. 12 is a figure for explaining billing processing of an interrupted sheet in a case where the power of the image forming apparatus 1 is turned ON in a case where image formation-based billing is performed.

As illustrated in FIG. 12, in step S241, a determination is made as to whether the power is turned ON or not.

When the power is ON, a determination is made as to whether or not the count value stored in the storage unit 82 which is a nonvolatile memory is zero which is the initial value in step S242.

In the case where the image formation-based billing is performed, the control unit 81 determines whether the print job has been continued or canceled based on the count value stored in the storage unit 82. More specifically, when the count value is not zero which is the initial value, the control unit 81 determines that the user performs an operation for cancelling the print job in step S243, and like the billing processing of the interrupted sheet, the control unit 81 clears the count value to zero. On the other hand, when the count value is zero which is the initial value, the processing in FIG. 12 is terminated.

In a case where the billing counter is counted by using the count value even in the case where the image formation-based billing is performed, the user is notified to that effect. The notification is performed by, for example, displaying a notification screen on the display unit 14 of the main body 10.

Figure 13:
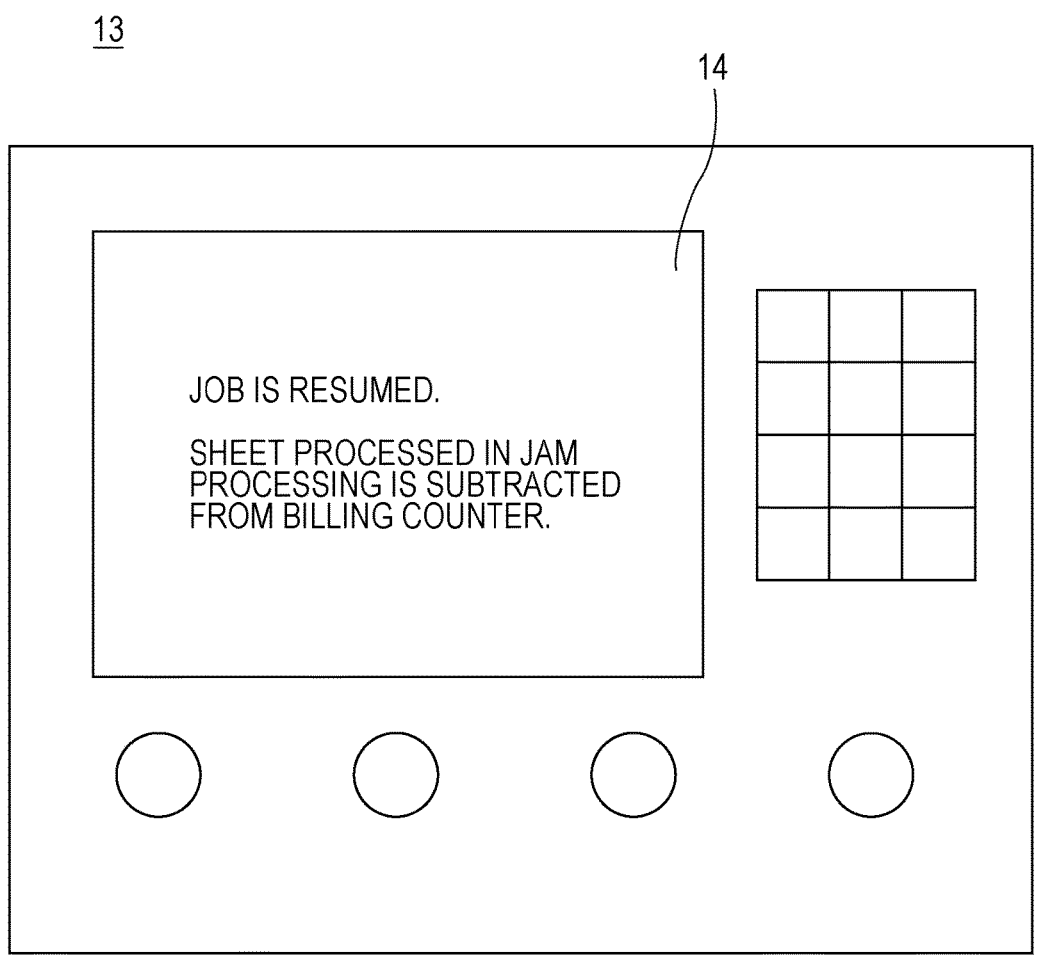
FIG. 13 is a figure illustrating an example of a notification screen.

FIG. 13 is a figure illustrating an example of a notification screen.

As illustrated in FIG. 13, a notification screen displayed on the display unit 14 is displayed when a print job is continuously performed. The notification screen displays a message indicating that the billing counter is counted by using the count value, so that the processing is performed to subtract the count value from the billing counter for the interrupted sheet. A notification screen is displayed as described above, so that the user is surely notified that the interrupted sheet is not billed. Therefore, the user can use the image forming apparatus 1 without anxiety.

The notification screen may also serve as a selection screen. In this case, the notification screen may be displayed when the user is prompted to enter a command for a consequence of the print job.

The notification is not limited to a notification given by displaying such a notification screen. Alternatively, a notification may be given by displaying a message indicating that the counting processing for the billing counter using the count value is performed on the display unit 84 of the billing apparatus 80. A notification may be given by outputting light or sound with the main body 10 and the billing apparatus 80. The notification may be given by sending information, in such a manner that the user can recognize the information, to the external device connected to the image forming apparatus 1.

Effects of Embodiment

In the image forming apparatus 1 configured as described above, when the print job is interrupted, the number of pages to be billed for the interrupted sheet is counted. Whether the counting processing for the billing counter using the count value is performed or not is switched in accordance with whether the print job is continued or cancelled. Therefore, while an interrupted sheet that may be used in a fraudulent manner is billed reliably, an occurrence of double billing of the interrupted sheet can be prevented. When resuming an interrupted print job, the print of the interrupted sheet can be executed again, so that the sheet having the image formed thereon can be discharged to the discharge tray 41 in a predetermined order. Even when a sheet jam and the like occur and the print job is interrupted, it is not necessary to perform annoying work such as rearranging the discharged sheets, so that the convenience of the image forming apparatus 1 can be enhanced.

Others

In the explanation about the above embodiment, basically, a purged sheet is to be billed, and a sheet remaining in the image forming apparatus is not to be billed. However, the embodiment is not limited thereto. For example, even a sheet which is remaining in the inside of the image forming apparatus 1 and which can be determined to be in a non-damaged state to such an extent that the sheet can be used in a fraudulent manner may be, e.g., counted as the billing target. For example, a sheet which is conveyed at the upstream with respect to a sheet that caused a sheet jam and which is stopped without difficulty in a non-bent conveying path may be considered to be in the non-damaged state based on that condition, and may be adopted as the billing target.

The method of calculating a billing unit number and a billing amount is not limited to the above. For example, the billing may be performed in units of the number of sheets, and the billing unit number may be differentiated depending on the state of the print (for example, presence of color, difference in the sheet size, and the like).

The image forming apparatus may be a monochrome/color copying machine, a printer, a facsimile apparatus, a multifunction peripheral (MFP) thereof, or the like. The present embodiment is not limited to forming an image by the electrophotographic method and may an apparatus forming an image by a so-called ink jet method.

The image forming apparatus may not have a post-processing apparatus. A purge function may not be provided.

The image forming system is not limited to an image forming apparatus in which the billing system as described above is built in or attached. The image forming system may be configured by connecting a billing system and an image forming apparatus via a network. In this case, the billing system may be configured to perform counting of the billing counter and billing the user by receiving information about operation from the image forming apparatus. The billing system may be configured to perform billing as described above by linking the processing unit provided inside of the image forming apparatus and the processing unit provided outside of the image forming apparatus. In other words, the image forming apparatus may be configured to perform a part of operation or all operations of the billing system.

The hardware configuration of the image processing apparatus is not limited to the above, and image processing may be performed by various control circuits.

The processing in the above described embodiment may be performed by software or hardware circuitry.

A program for executing processing in the above embodiment may be provided, and the program may be recorded on a recording medium such as a CD-ROM, a flexible disk, a hard disk, a ROM, a RAM, a memory card, and the like to be provided to the user. The program may be downloaded to an apparatus via a communication line such as the Internet. The processing described in the text with the flowchart explained above is executed by a CPU and the like according to the program.

Although the present invention has been described and illustrated in detail, it is clearly understood that the same is by way of illustrated and example only and is not to be taken by way of limitation, the scope of the present invention being interpreted by terms of the appended claims. The scope of the present invention is intended to include meanings equivalent to claims and all modifications within the scope.

What is claimed is:

1. A billing system used together with an image forming apparatus for forming an image on a sheet and discharging the sheet, the billing system comprising:
   a counting unit for counting, when a print job is interrupted in the image forming apparatus, a billing unit number for a sheet which already has an image formed thereon when the interruption occurs and which has not yet discharged from the image forming apparatus;
   a determination unit for determining whether the print job is continued or cancelled after the print job is interrupted in the image forming apparatus; and
   a billing unit for counting a billing counter corresponding to an amount for which the image forming apparatus is used, and billing a user who uses the image forming apparatus according to the billing counter;
   wherein the billing unit switches whether the billing counter is counted by using a count result of the counting unit in accordance with a determination result of the determination unit.

2. The billing system according to claim 1, wherein the image forming apparatus includes a purge function, and when a print job is interrupted in the image forming apparatus, the counting unit counts a billing unit number of a sheet which is discharged from the image forming apparatus with the purge function and which has an image formed thereon.

3. The billing system according to claim 1, wherein the billing unit counts the billing counter based on a billing unit number for a sheet normally discharged from the image forming apparatus.

4. The billing system according to claim 3, wherein when the determination unit determines that the print job is continued, the billing unit counts the billing counter without using a count result of the counting unit.

5. The billing system according to claim 3, wherein when the determination unit determines that the print job is cancelled, the billing unit counts the billing counter by adding a number counted by the counting unit to the billing unit number for the sheet normally discharged from the image forming apparatus.

6. The billing system according to claim 1, wherein the billing unit counts the billing counter based on a billing unit number according to a number of times images are formed on sheets.

7. The billing system according to claim 6, wherein when the determination unit determines that the print job is continued, the billing unit counts the billing counter by subtracting a count result of the counting unit from the billing unit number.

8. The billing system according to claim 6, wherein when the determination unit determines that the print job is cancelled, the billing unit counts the billing counter without using a count result of the counting unit.

9. The billing system according to claim 1, wherein the determination unit determines whether the print job is continued or cancelled based on an operation performed by the user.

10. The billing system according to claim 1, wherein the counting unit stores a count value to a nonvolatile memory, and when a power of the image forming apparatus is turned ON, the determination unit determines whether the print job is cancelled or not based on the count value stored in the nonvolatile memory.

11. The billing system according claim 1, wherein the billing system further includes a notification unit, and
   in a case where the billing unit counts the billing counter by using a count result of the counting unit, the notification unit notifies the user to that effect.

12. An image forming system comprising:
   an image forming apparatus including an image forming unit forming an image on a sheet and a discharge unit discharging a sheet having an image formed thereon with the image forming unit; and
   the billing system according to claim 1.

13. A control method of a billing system used together with an image forming apparatus for forming an image on a sheet and discharging the sheet, the method comprising:
   a counting step of counting, when a print job is interrupted in the image forming apparatus, a billing unit number for a sheet which already has an image formed thereon when the interruption occurs and which has not yet discharged from the image forming apparatus;
   a determination step of determining whether the print job is continued or cancelled after the print job is interrupted in the image forming apparatus;
   a billing step of counting a billing counter corresponding to an amount for which the image forming apparatus is used, and billing a user who uses the image forming apparatus according to the billing counter,
   wherein in the billing step, whether the billing counter is counted by using a count result in the counting step is switched in accordance with a determination result in the determination step.

14. A non-transitory recording medium storing a computer readable control program of a billing system used together with an image forming apparatus for forming an image on a sheet and discharging the sheet, the program causing a computer to execute:
- a counting step of counting, when a print job is interrupted in the image forming apparatus, a billing unit number for a sheet which already has an image formed thereon when the interruption occurs and which has not yet discharged from the image forming apparatus;
- a determination step of determining whether the print job is continued or cancelled after the print job is interrupted in the image forming apparatus; and
- a billing step of counting a billing counter corresponding to an amount for which the image forming apparatus is used, and billing a user who uses the image forming apparatus according to the billing counter,
- wherein in the billing step, whether the billing counter is counted by using a count result in the counting step is switched in accordance with a determination result in the determination step.

* * * * *